United States Patent [19]

Gourgue

[11] Patent Number: 5,471,648
[45] Date of Patent: Nov. 28, 1995

[54] DEVICE FOR CORRECTING FREQUENCY SHIFT DUE TO THE DOPPLER EFFECT IN A TRANSMISSION SYSTEM

[75] Inventor: Frédéric Gourgue, Paris, France

[73] Assignee: Societe Anonyme Dite Alcatel Radiotelephone, Paris, France

[21] Appl. No.: 143,749

[22] Filed: Nov. 1, 1993

[30] Foreign Application Priority Data

Nov. 3, 1992 [FR] France ................. 92 13156

[51] Int. Cl.$^6$ ............ H04B 1/10; H04B 7/185; H04J 3/06
[52] U.S. Cl. ............ 455/63; 455/12.1; 455/67.6; 342/99; 342/358; 370/104.1
[58] Field of Search ............ 455/62, 63, 266, 455/12.1, 13.2, 67.6, 296, 260; 342/173, 174, 99, 358; 370/104.1

[56] References Cited

U.S. PATENT DOCUMENTS

| | | | |
|---|---|---|---|
| 3,262,116 | 7/1966 | Hutchinson et al. | 455/12.1 |
| 3,940,695 | 2/1976 | Sickles, II | 455/69 |
| 4,019,138 | 4/1977 | Watanabe et al. | 455/13.2 |
| 4,191,923 | 3/1980 | Schelish | 455/13.2 |
| 4,233,626 | 8/1983 | Ames | 455/12.1 |
| 5,063,387 | 11/1991 | Mower | 455/260 |
| 5,095,538 | 3/1992 | Durboraw, III | 370/104.1 |
| 5,261,120 | 11/1993 | Suzuki et al. | 455/63 |

FOREIGN PATENT DOCUMENTS 0337269  10/1989  European Pat. Off. .

Primary Examiner—Reinhard J. Eisenzopf
Assistant Examiner—Mark D. Wisler
Attorney, Agent, or Firm—Sughrue, Mion, Zinn, Macpeak & Seas

[57] ABSTRACT

The present invention relates to a device for correcting a frequency shift due to the Doppler effect in a transmission system. The device for correcting a frequency shift due to the Doppler effect is applicable to a transmission system in which a signal is transmitted in a transmission lobe between a transmitter and a receiver that are in relative motion. The frequency shift which is the difference between the frequency of the transmitted signal as measured at the receiver and as measured at the transmitter is presented as the sum of a center frequency characteristic of the transmission lobe plus a position frequency which is a function of the position of the receiver in the transmission lobe. The device includes means for tuning the receiver which has a tuning frequency such that said tuning frequency is equal to the sum of the transmitted frequency plus the center frequency.

8 Claims, 2 Drawing Sheets

DEVICE FOR CORRECTING FREQUENCY SHIFT DUE TO THE DOPPLER EFFECT IN A TRANSMISSION SYSTEM

The present invention relates to a device for correcting frequency shift due to the Doppler effect in a transmission system.

BACKGROUND OF THE INVENTION

In the transmission systems under consideration, a transmitter transmits a signal destined for a receiver, said two elements being in motion relative to each other. This applies, for example, in a satellite transmission system when the transmitter or the receiver placed on a satellite is in communication with terrestrial equipment, and assuming that the satellite moves relative to the Earth, i.e. assuming that the satellite is not in a geostationary orbit. The transmitted signal is in the form of a modulated carrier wave and it is subjected to the Doppler effect, which phenomenon is well-known to the person skilled in the art and does not require further explanation. This gives rise to a frequency shift in the carrier wave depending on whether it is measured at the transmitter or at the receiver. Seen from a receiver that is unaware of this Doppler shift, it appears that there is a change in the frequency of the carrier wave to which the receiver is to be tuned, and this has the effect of degrading the quality of the signal conveyed by the carrier. It is therefore necessary to correct for this frequency shift. So long as the shift remains small, a conventional frequency servo-control device in the receiver, such as a phase-locked loop, enables effective correction to be performed. However, once the frequency shift becomes large, as happens in particular in satellite radiocommunications systems, known devices for providing correction become considerably more complex and as a result more expensive. By way of example, mention may be made of the double phase-locked loop, well-known to the person skilled in the art for being difficult to implement.

OBJECTS AND SUMMARY OF THE INVENTION

An object of the present invention is thus to provide a device for correcting a frequency shift due to the Doppler effect and suitable for inclusion in a transmission system having a receiver designed for compensating limited variations in the frequency of the carrier wave. To clarify the description, it is assumed below that the carrier wave is the same as the transmitted signal.

The device for correcting a frequency shift due to the Doppler effect is applicable in a transmission system where a signal is transmitted within a transmission lobe between a transmitter and a receiver that are in relative motion. The frequency shift, which is the difference between the frequency in the transmitted signal as measured at the receiver and as measured at the transmitter, appears as the sum of a center frequency characteristic of the transmission lobe and of a position frequency that is a function of the position of the receiver within the transmission lobe. According to the invention, the device comprises means for tuning the receiver which has a tuning frequency such that the tuning frequency is equal to the sum of the transmitted frequency and of the center frequency.

The frequency servo-control device of the receiver is thus considerably simplified.

In addition, and advantageously, the center frequency is substantially equal to one-half of the sum of the extreme values that the frequency shift can take in the transmission lobe.

In a first embodiment, the means for tuning the receiver impose a transmission frequency on the transmitter equal to the tuning frequency of the receiver minus the center frequency.

Since the correction device is thus disposed in the transmitter, the receiver does not require any special means.

In a second embodiment, the means for tuning the receiver set the tuning frequency of the receiver as the transmission frequency of the transmitter plus the center frequency.

In which case, the means of the invention are no longer disposed in the transmitter, but are in the receiver.

In a third embodiment of the invention, the means for tuning the receiver comprise a first module disposed in the transmitter and a second module disposed in the receiver, at least one of the modules having correction capacity that is less than the center frequency, the transmission system being designed to share the frequency shift correction between the two modules.

In which case, the means of the invention are shared between the transmitter and the receiver, and, in addition, the invention relates to each of these modules separately.

Furthermore, the invention also relates to equipment provided for two-way communication by means of a signal in each communication direction. Such equipment comprises a device as specified above for each of its signals.

BRIEF DESCRIPTION OF THE DRAWING

The invention appears more clearly from the following description of embodiments given by way of example and described with reference to the accompanying drawing, in which.

MORE DETAILED DESCRIPTION

Figure 1:
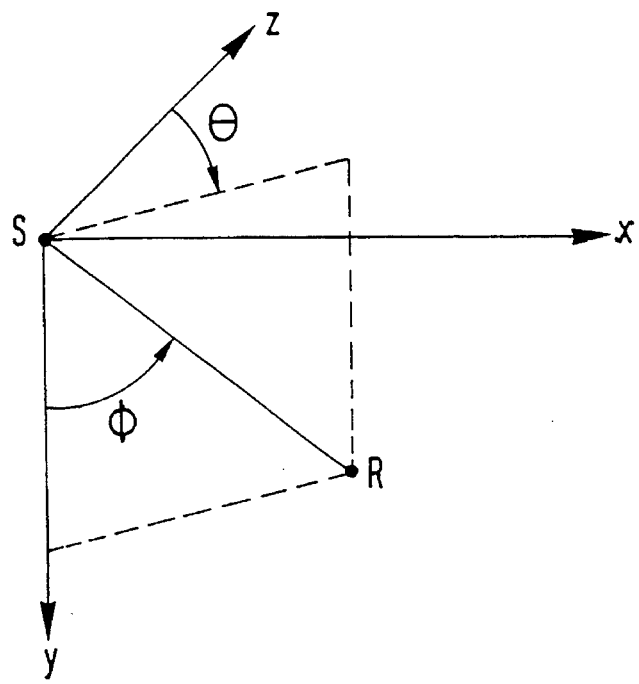
FIG. 1 shows a satellite-based coordinate system including terrestrial equipment.

Initially, it is assumed that a satellite S is provided with a transmitter that transmits a radio signal to a receiver R forming an integral portion of terrestrial equipment. As shown in FIG. 1, an orthogonal coordinate system Sxyz can then be defined based on the satellite, with the axis Sx extending along the satellite displacement direction, the axis Sy representing the vertical directed towards the center of the earth, and consequently the axis Sz is normal to the plane Sxy such that the resulting frame of reference constitutes a righthand system of axes. The line SR between the satellite and the receiver is then fully defined by means of two angles, the first angle $\theta$ being between Sz and the projection of SR on the plane Szx, and the second angle $\phi$ being between Sy and SR.

At the receiver, a signal transmitted by the satellite S is subject to a frequency shift $\delta f$ which is determined by the frequency $f_e$ of the transmitted signal, the speed of the satellite, and the two angles θ, φ defining the line SR. As a result, the frequency $f_r$ of the received signal is the sum of the frequency $f_e$ of the transmitted signal and of the frequency offset δf: $f_r=f_e+δf$.

In addition, it is common practice to use the term "transmission lobe" to designate the coverage zone of a transmitter, i.e. the set of points in three dimensions in which a receiver can receive a signal transmitted by said transmitter. It thus appears that for a given transmission lobe, the frequency shift δf varies within a range limited by a minimum value $δf_{min}$ and by a maximum value $δf_{max}$.

These two extreme values depend solely on the transmission system, i.e. on the frequency of the transmitted signal, on the speed of the satellite, and on the transmission lobe defined as a function of the above-identified angles θ and φ. They do not depend on the position of the receiver within the transmission lobe.

A magnitude characteristic of the transmission lobe can be defined, which magnitude is equal to one-half of the sum of the extreme values $δf_{min}$ and $δf_{max}$ of frequency shift. This magnitude likewise depends solely on the transmission system, and the invention lies specifically in eliminating the effect thereof by performing a frequency shift at the transmitter or at the receiver by a frequency equivalent to said magnitude. In practice, a center frequency $f_c$ is selected which, for various reasons, need not necessarily be exactly equal to half of the sum of the extreme values $δf_{min}$ and $δf_{max}$, but which is close thereto. It is often necessary to satisfy certain technical constraints, if only the quantization step size of a frequency synthesizer, for example. The important point is that this center frequency $f_c$ characteristic of a transmission lobe serves to reduce to a minimum the amount of frequency correction necessary in all possible receiver positions within the lobe. In other words, the frequency δf can be considered as being the sum of a center frequency $f_c$ that is independent of the receiver, plus a position frequency $f_p$ that is a function of the position of the receiver in the transmission lobe, with the center frequency being selected in such a manner that the correction which is applied to the position frequency $f_p$ only is as small as possible:

$$δf=f_c+f_p$$

In a first embodiment, the frequency shift is corrected in the transmitter. With the receiver being designed to receive a signal at a tuning frequency $f_a$, the transmitted signal is transmitted at a transmission frequency $f_e$ equal to the tuning frequency $f_a$ minus the center frequency $f_c$:

$$f_e=f_a-f_c$$

As a result the reception frequency $f_r$ is given by:

$$f_r=f_a+f_p$$

The frequency error to be corrected is indeed limited to the position frequency $f_p$ which itself varies between two limits $f_{pmin}$ and $f_{pmax}$.

The invention is naturally applicable to the general case where the satellite includes a plurality of transmitters each associated with its own transmission lobe.

Figure 2:
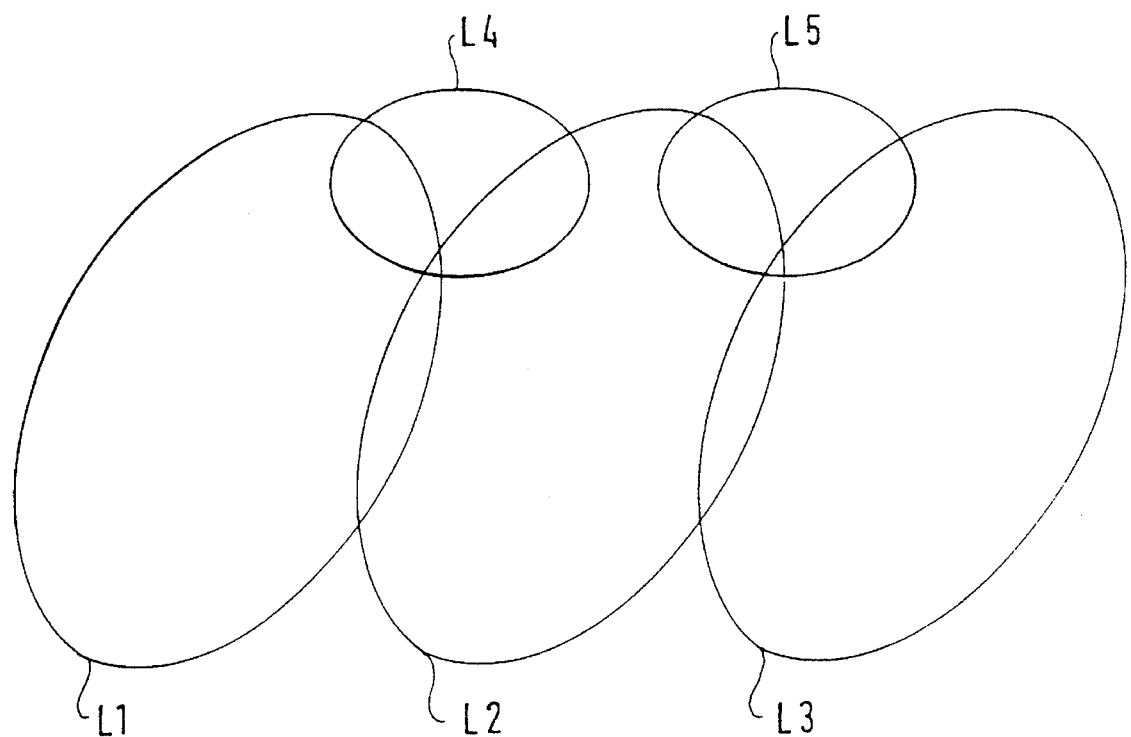
FIG. 2 shows the projection of a plurality of transmission lobes corresponding to a plurality of transmitters situated in the satellite.

By way of example, a satellite at an altitude of about 1,300 km and transmitting at a frequency close to 1.5 GHz could use five transmitters to produce five transmission lobes L1, L2, L3, L4, and L5 which, when projected on the surface of the earth, have the appearance shown diagrammatically in FIG. 2. The various data of the transmission system appear in the following table:

| lobe | $δf_{min}$ | $δf_{min}$ | $f_c$ | $f_{pmin}$ | $f_{pmax}$ |
|---|---|---|---|---|---|
| L1 | −30 kHz | −10 kHz | −20 kHz | −10 kHz | +10 kHz |
| L2 | −10 kHz | +10 kHz | 0 | −10 kHz | +10 kHz |
| L3 | +10 kHz | +30 kHz | −20 kHz | −10 kHz | +10 kHz |
| L4 | −15 kHz | −3 kHz | −9 kHz | −6 kHz | +6 kHz |
| L5 | 0 | 18 kHz | 9 kHz | −9 kHz | +9 kHz |

In this case, a receiver that needs to operate in any of the transmission lobes must correct an offset lying in the range $f_{pmin}$ to $f_{pmax}$, i.e. −10 kHz to +10 kHz, whereas without the device of the invention, the offset to be corrected would cover the range −30 kHz to +30 kHz.

Naturally the invention is advantageous only if the center frequency $f_c$ is not zero. Nevertheless, should the center frequency be zero, this will happen in one lobe only and advantage remains in the other lobes.

It is assumed above that the transmitter is on the satellite and that the receiver is in terrestrial equipment. The term "terrestrial equipment" is used to cover equipment that may be stationary or mobile, e.g. in a vehicle, providing the speed with which the equipment moves relative to the earth is small compared with the speed of the satellite relative to the earth. Naturally, the solution proposed is entirely symmetrical and is equally applicable to a transmitter in the terrestrial equipment and a receiver in the satellite.

In a second embodiment, instead of being corrected in the transmitter, the frequency shift is corrected in the receiver. The transmission system is thus designed so that the receiver knows the value of the center frequency $f_c$ of the transmission lobe in which it is to be found. Since it naturally knows the transmission frequency $f_e$ of the transmitted signal, it can then calculate its tuning frequency as being the sum of the transmission frequency $f_e$ plus the center frequency $f_c$:

$$f_a=f_e+f_c$$

Means for communicating the center frequency to the receiver are within the competence of the person skilled in the art and are not described further. It is merely specified that the center frequency of a particular lobe may be communicated while occupying the preceding transmission lobe or else at the beginning of reception, the receiver attempting to tune to various different center frequency values until it finds one that makes tuning possible.

As in the preceding embodiment, this embodiment provides a solution that is symmetrical and that is applicable regardless of whether the transmitter is on the satellite and the receiver is in the terrestrial equipment or vice versa.

Furthermore, the invention is also applicable to the general case of both-way communication, i.e. when a first equipment provided with a transmitter and a receiver is in communication respectively with a receiver and a transmitter in a second equipment. Under such circumstances, the Doppler effect is applied to the signals transmitted from each of the equipments. It is necessary to provide a frequency offset correction device for each of the transmitted signals.

An advantageous solution consists in providing both correction devices in the same equipment, thereby making it possible to simplify the other equipment correspondingly.

Figure 3:
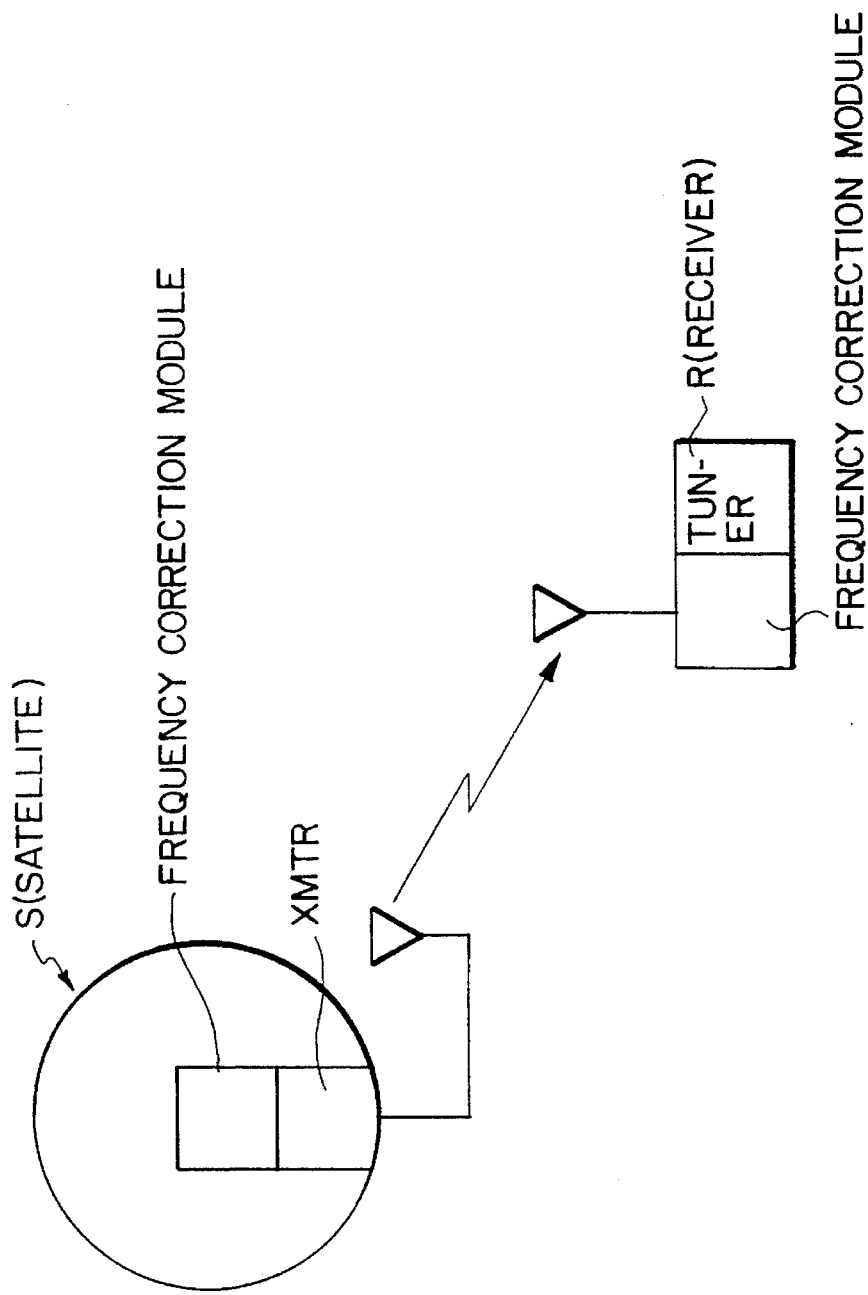
FIG. 3 is a schematic block diagram of the basic hardware of the satellite-based coordinate system and terrestrial equipment illustrated in FIG. 1.

It is assumed above that the frequency shift correction device is in the form of a single module disposed either in the transmitter or else in the receiver. That constitutes merely one way in which the invention can be described, and not the essence of the invention. For a wide range of reasons, it is quite possible to envisage the device of the invention comprising two complementary modules, one disposed in the transmitter and the other in the receiver. FIG. 3 shows an example of such a transmission system, wherein a transmitter and one module are in the satellite and a receiver and a complementary module are in the terrestrial equipment. Under such circumstances, each module performs a portion of the correction such that the overall correction always corresponds to the center frequency.

Consider the following configuration by way of example. The transmitter is disposed in the terrestrial equipment and is capable by means of first module of applying a maximum correction equal to a modification frequency $f_1$. If the center frequency is greater than the modification frequency $f_2$, the center frequency $f_c$ to be corrected can then be considered as being the sum of said modification frequency $f_1$ plus a compensation frequency $f_2$.

The transmission system is thus designed so that if the center frequency is less than the modification frequency, the first module is controlled to apply a correction equal to the center frequency, in which case the second or other module is inoperative. However, if the center frequency is greater than the modification frequency, then the transmission system causes the first module to apply a correction equal to the modification frequency, and it causes the second module to apply a correction equal to the compensation frequency.

In practice, the transmission system can be so organized so as to require the first module to provide a correction equal to the center frequency. The first module can thus have a limited correction range and can under no circumstances apply a correction greater than the modification frequency. This point may be covered by a specification or by a standard, for example. Thus, for a transmission system that knows the center frequency and the modification frequency, the second module is used if the center frequency is greater than the modification frequency so as to apply a correction equal to the compensation frequency, and otherwise the second module is not required to perform any correction.

Such a configuration is given purely by way of example and shows clearly that it is possible for the correction device to be distributed so that a portion thereof is in the transmitter and another portion is in the receiver. Such a solution may be advantageous, particularly if the transmitter has limited correction capacity, e.g. in order to satisfy constraints on size or cost, or of any other kind.

I claim:

1. A device for correcting a frequency shift due to the Doppler effect in a transmission system wherein:
    a signal is transmitted in a transmission lobe between a transmitter and a receiver in relative motion;
    said frequency shift is defined by a difference between a received frequency of said signal as measured at said receiver and a transmitted frequency of said signal as measured at said transmitter;
    said frequency shift is also defined as the sum of a center frequency, characteristic of said transmission lobe, and a position frequency; and
    said position frequency is a function only of a position of said receiver in said transmission lobe;
    said device comprising:
    tuning means for tuning said receiver, which has a tuning frequency, to make said tuning frequency equal to a sum of said transmitted frequency and said center frequency; and
    correcting means for correcting a frequency error to be corrected, wherein said frequency error to be corrected is defined by a difference between said tuning frequency and said position frequency.

2. A device according to claim 1, wherein the means for tuning said receiver impose a transmission frequency on said transmitter equal to the tuning frequency of said receiver minus said center frequency.

3. A device according to claim 1, wherein the means for tuning said receiver set the tuning frequency of the receiver as the transmission frequency of said transmitter plus said center frequency.

4. A device according to claim 1, wherein the means for tuning said receiver comprise a first module disposed in said transmitter and a second module disposed in said receiver, at least one of said modules having correction capacity that is less than said center frequency, said transmission system being designed to share said frequency shift correction between said two modules.

5. A device according to claim 1, wherein said device is placed in mobile equipment for radiocommunication by satellite.

6. The device as set forth in claim 1, wherein said center frequency is substantially equal to one-half of a sum of a maximum value and a minimum value that said frequency shift can have in said transmission lobe.

7. A device for correcting a frequency shift due to the Doppler effect in a transmission system where a signal is transmitted in a transmission lobe between a transmitter and a receiver in relative motion, wherein said frequency shift is the difference between the frequency of said transmitted signal as measured at said receiver and as measured at said transmitter, and is defined as the sum of a center frequency characteristic of said transmission lobe plus a position frequency which is a function of the position of said receiver in said transmission lobe, the device comprising means for tuning said receiver, which has a tuning frequency, to make said tuning frequency equal to the sum of said center frequency and said frequency of said transmitted signal; and wherein said center frequency is substantially equal to one-half of the sum of the extreme values that said frequency shift can take in said transmission lobe.

8. Equipment for two-way communication by means of signals in respectively opposite communication directions, the equipment comprising a device for correcting a frequency shift due to the Doppler effect in a transmission system where a signal is transmitted in a transmission lobe between a transmitter and a receiver in relative motion, wherein said frequency shift is the difference between a received frequency of said signal as measured at said receiver and a transmitted frequency of said signal as measured at said transmitter, and wherein said frequency shift is also defined as the sum of a center frequency, characteristic of said transmission lobe, plus a position frequency which is a function of a position of said receiver in said transmission lobe, the device comprising means for tuning said receiver, which has a tuning frequency, to make said tuning frequency equal to the sum of said transmitted frequency and of said center frequency.

* * * * *